(12) United States Patent
Carmona

(10) Patent No.: US 6,881,093 B2
(45) Date of Patent: Apr. 19, 2005

(54) WIRING MODULE FOR AUTOMOTIVE VEHICLE

(76) Inventor: German Antonio Carmona, 3405 Putnam Pl., E1, Bronx, NY (US) 10467

(*) Notice: Subject to any disclaimer, the term of this patent is extended or adjusted under 35 U.S.C. 154(b) by 0 days.

(21) Appl. No.: 10/910,549

(22) Filed: Aug. 3, 2004

(65) Prior Publication Data

US 2005/0032417 A1 Feb. 10, 2005

Related U.S. Application Data

(60) Provisional application No. 60/492,464, filed on Aug. 4, 2003.

(51) Int. Cl.[7] .............................................. H01R 11/00
(52) U.S. Cl. ...................................... 439/502; 307/10.1
(58) Field of Search ................................ 439/502–505, 439/500, 34, 76.2; 123/600, 618–619; 361/728–729; 307/9.1, 10.1, 10.6, 96

(56) References Cited

U.S. PATENT DOCUMENTS

| | | | | |
|---|---|---|---|---|
| 5,055,066 A | * | 10/1991 | Garretson | 439/464 |
| 5,442,518 A | * | 8/1995 | Beam | 361/690 |
| 5,507,668 A | * | 4/1996 | Lambrinos et al. | 439/502 |
| 5,589,715 A | * | 12/1996 | Nishitani et al. | 307/10.1 |
| 6,511,342 B1 | * | 1/2003 | Hein et al. | 439/502 |
| 2002/0019165 A1 | * | 2/2002 | Aoki et al. | 439/502 |
| 2002/0092508 A1 | * | 7/2002 | Kanekawa et al. | 123/543 |

* cited by examiner

Primary Examiner—Michael C. Zarroli
(74) Attorney, Agent, or Firm—Herbert Dubno

(57) ABSTRACT

A wiring module for an automotive vehicle facilitates pulsed or continuous operation of a load from continuous positive or negative inputs or from inputs which can be connected to a positive type or negative type car alarm. The module has a sealed housing with a relay and transistor circuitry for electronic pulsing and amplification of trigger signals.

12 Claims, 2 Drawing Sheets

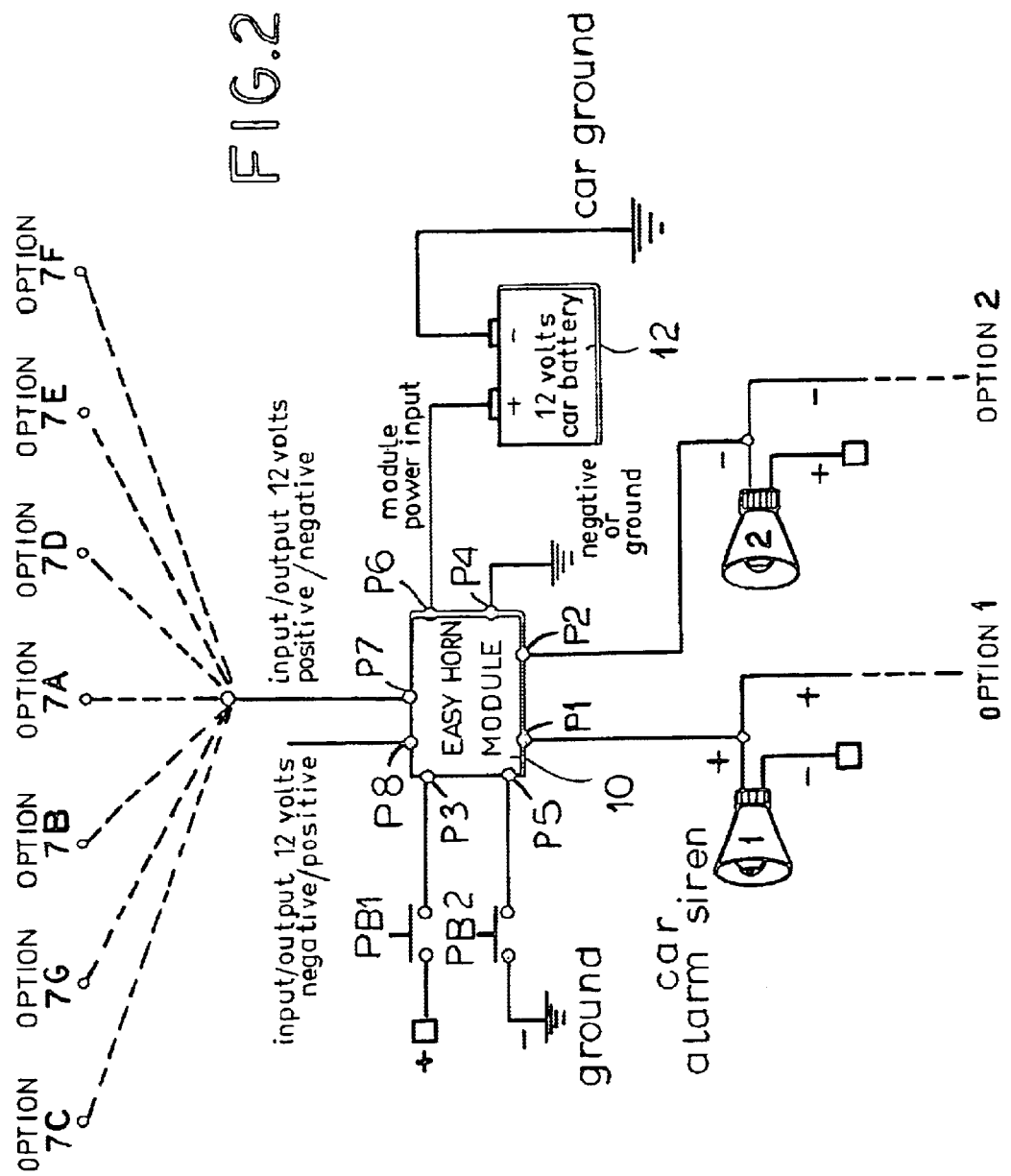

WIRING MODULE FOR AUTOMOTIVE VEHICLE

CROSS REFERENCE TO RELATED APPLICATION

This application is a nonprovisional application based upon provisional application 60/492,464 filed Aug. 4, 2003.

FIELD OF THE INVENTION

The present invention relates to a wiring module for an automotive vehicle and, more particularly, to a module that facilitates the connection of air horns, remote controls, amplifiers, electric fans, power antennae, lights, horns and the like to existing automotive electrical systems.

BACKGROUND OF THE INVENTION

It is frequently desirable or necessary to connect a variety of electrically powered components to existing electrical systems of an automotive vehicle. These may include air horns, alarms systems which may utilize flashing lights or the like, amplifiers, cooling fans or sound amplifiers, power antennae, fog lights, neon lights and the like.

In the past the connection of such units has been generally effected manually and has been fraught with problems. For example, when flashers had to be provided, they normally were sensitive to the incursion of moisture and produced interference which could affect the radio or sound systems. Furthermore, the flashers changed frequencies depending upon load, or would not operate if not connected to a significant load.

When remote controls were used with earlier systems, they frequently had insufficient power to operate the power amplifier of the sound system. Special precautions had to be taken when wiring flashing components and amplifiers into the system and, since wiring had to be done individually or each component added, comparatively problems frequently were not addressed.

In addition, if the wiring was not done by professionally qualified personnel, problems were encountered with the installed components as well as with factory-installed or original equipment.

The problems were particularly pronounced for cars with alarm systems or on which air horns had to be added.

OBJECTS OF THE INVENTION

It is, therefore, the principal object of the present invention to provide a wiring module which can facilitate the wiring of one or more additional components into the wiring system of a vehicle without the drawbacks described.

Another object is to provide a wiring module for the purposes described which can allow both the professional and amateur to wire components into the system which have hitherto created compatibility problems.

Still another object of the invention is to provide a highly versatile wiring module which can utilize both positive and negative tracking of selected loads and which can operate not only continuously powered components, such as a car amplifier, cooling fans, lights, power antennae and air units, also flashing components or intermittently operable loads in a selective manner.

SUMMARY OF THE INVENTION

These object are achieved with a wiring module for an automotive vehicle which comprises:

a housing;

a first conductor connectable to a positively poled terminal of an intermittently operable load;

a second conductor connectable to a negatively poled terminal of an intermittently operable load;

a third conductor connectable to a positively poled trigger;

a fourth conductor connectable to a negative source terminal or vehicle ground;

a fifth conductor connectable to a negatively poled trigger;

a sixth conductor connectable to a positive source terminal;

seventh and eighth conductors interchangeable in function and one of which is connectable to a further load to be continuously operated at a voltage, usually the source voltage, applied to the other upon energization of one of the triggers; and circuitry in the module for actuating the further load and for electronically intermittently operating one of the intermittently operable loads upon respective connection to the conductors in response to selective energization of the triggers.

As a practical matter it has been found to be advantageous to provide the first through eighth conductors described with particular colors to facilitate wiring. For example, the sixth conductor, running to a power source, such as the positive terminal of the car battery may be a red wire while the seventh and eighth conductors, one of which can be connected to the source voltage (battery) while the other is connected to a load, can be yellow. The yellow one of these wires can be a positive power output of the module if the other yellow wire is positive and can be connected to the motor of an air horn, the parking lights, the headlights or the other components to be powered without flashing or to other components which are to be flashed. Correspondingly the fourth conductor, connected to the negative side of the battery or ground to the vehicle chassis is the ground of the module and a black wire. If the other load is to be switched to apply a negative polarity, one of the yellow wires is connected to the negative side of the battery and the other to the load.

The first conductor may be a gray one which is a positive voltage input at 10 to 15 volts and can have a flash voltage output to an alarm siren. A brown wire my form the second conductor and can receive a negative input from an alarm module utilizing the negative side to excite the respective alarm.

The third conductor providing the positive trigger may be a blue wire and may receive its input from a low voltage (say 5 volts positive) from, for example, a switch or a low voltage remote control, to trigger a high current at the plain red output 7 conductor. The negative trigger at the fifth conductor can be a green wire and also can output, for the duration of the trigger signal, the high current to the load at the seventh conductor or the yellow conductor. It is important to note that the third conductor (terminal 3 or the blue wire) can be a voltage elevator in the sense that, for example, the application of say 5 VDC to A by a remote control, can produce a higher voltage of say 12 VDC at the output with a positive or negative polarity.

According to a feature of the invention, the housing containing the circuitry and from which the conductors emerge, is a sealed unit so that the circuitry is not affected by moisture or water. The circuitry can comprise a normally open relay which is switchable by the triggers and has contacts which connect the seventh and eighth conductors upon energization of the relay which is switchable by the triggers. To one of the seventh and eighth conductors, 12 VDC positive or negative is applied and upon energization of the relay that potential is applied to the other of these conductors or terminals. and has contacts which connect the sixth and seventh conductors upon energization of the relay.

According to a feature of the invention the circuit comprises a reverse-poled diode connected the second conductor, and a first transistor having a base connected to the diode, an emitter connected to the sixth conductor and a collector connected to the first conductor.

Preferably the circuit further comprises a forwardly poled further diode connected to the third conductor, and a further transistor having a base connected to the further diode, an emitter connected to the fourth conductor, and a collector connected through a diode to the relay at a junction with a reversely poled diode connected to the fifth conductor.

Advantageously the circuit also comprises another transistor having a base connected to the first conductor through the forwardly poled diode thereof, an emitter connected to the fourth conductor, and a collector connected through a capacitor to the base of the further transistor, the collector of the further transistor being connected to the base of the other transistor through another capacitor.

The circuitry can include a first conductor and the base of the other transistor, a second resistor between the forwardly poled diode of the first conductor and the base of the further transistor, a third resistor connected between the forwardly poled diode of the first conductor and the collector of the other transistor, a fourth resistor connected between the forwardly poled diode of the third conductor and the base of the further transistor, a fifth resistor connected between the reversely poled diode of the second conductor and the base of the first transistor, and a sixth resistor connected between the emitter and base of the first transistor.

BRIEF DESCRIPTION OF THE DRAWING

The above and other objects, features, and advantages will become more readily apparent from the following description, reference being made to the accompanying drawing in which:

FIG. 2 is a block diagram illustrating the use of the module in a motor vehicle.

SPECIFIC DESCRIPTION

Figure 1:
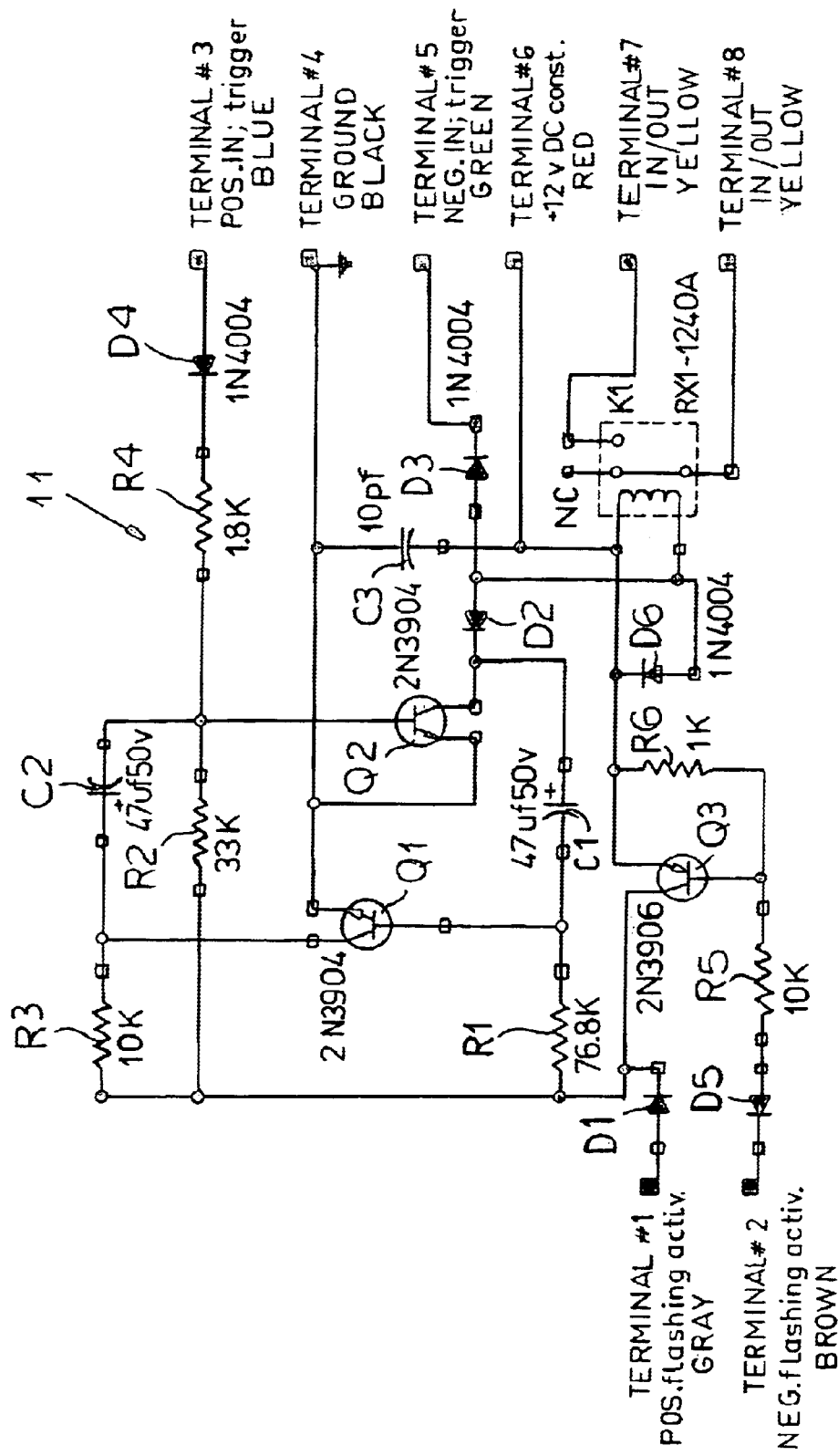
FIG. 1 is a circuit diagram of the module of the present invention.

The module of the present invention comprises within a housing 10 (FIG. 2) which is sealed to prevent the incursion of water, a circuit 11 (FIG. 1) which comprises a number of terminals P1–P8, corresponding to respective conductors which will be identified as the first . . . eighth conductors, respectively, and can be provided on the housing for connection to the circuitry of the motor vehicle, as will be described.

The first and second conductors connected at terminals P1 and P2, respectively, are the gray positive flashing conductor and the brown negative flashing conductor, respectively, and are connected through a forwardly-poled diode D1 to a collector and the reversely-poled diode D5 and a resistor R5 to the base of a first transistor Q3, respectively. The emitter of the transistor Q3 is connected to the red wire forming the sixth conductor and the terminal P6 running to the positive terminal of the car battery 12. The emitter of the transistor Q3 is also connected to one side of the coil of a relay RL1 whose contacts bridge the terminals P7 and P8 and thus, upon closure, close a circuit between these yellow conductors. A bias resistor R6 connects the emitter and base of this transistor. A diode D6 is connected across the relay coil to eliminate parasitic effects.

A further transistor Q2 has its base connected via the resistor R4 and the forwardly-poled diode D4 to the third conductor and the terminal P3 receiving a positive trigger signal, e.g. from a remote control. The emitter of this transistor Q2 and the emitter of another transistor Q1 are connected to the fourth ground conductor and terminal P4. The collector of the transistor Q2 is connected through a forwardly-poled diode to the opposite side of the coil of relay RL1 and a reversely-poled diode D3 receiving the negative trigger via the green fifth conductor and terminal P5. A capacitor C3 is connected between the sixth and fourth conductors to eliminate parasitic effects.

The other transistor Q1 has, as noted, its emitter connected to the emitter of the transistor Q2 and to the fourth conductor (ground) at the terminal P4, its collector connector to the junction of resistor R3 and capacitor C2 and its base to the junction of the resister R1 and capacitor C1.

The transistors Q1 and Q2 can be type 2N3904 while transistor Q3 is of type 2N3906. Capacitor C1 can be a 100 mf capacitor and capacitor C2 a 47 mf capacitor. Resistors R1 and R2 can be 33 k ohm resistors, resistor R3 a 10K ohm resister, resisters 4 and 5 3.3 k ohm resistors and resister R6, a 1k ohm resister. The diodes D1–D5 can be of type 1N4003. All values are given by way of example only and can be varied if desired.

From FIG. 2, it will be apparent that the terminal P1 can be connected by the gray first conductor to flash the car alarm siren 1 and can be connected to a positive output of alarm system referred to as option 1. If a negative output alarm system is provided (option 2) the brown second conductor can connect the negative flashing terminal P2 to its car alarm siren as represented at 2.

In FIG. 2, moreover, the positive trigger (blue third conductor) connected to the terminal P3 can have a switch PB1 and series therewith and can be connected to a low positive voltage output of a remote control. The black wire from terminal P4 is connected to the negative terminal of the car battery 11 or the chassis ground while the green negative trigger can be connected to a negative input or ground through another switch PB2. Actuation of either switch PB1 or PB2 can trigger an output at the terminal P7 and in the yellow wire forming the seventh conductor to operate any of the options 7A–7G, including the power amplifier and other components as has been described. The power which is delivered, of course, derives from the power terminal of the battery 11 through the other yellow wire P8 (eighth conductor). If the load 7A–7G is to be switched negative, the eighth conductor or terminal P8 is connected to the battery negative or chassis ground. The two wires forming the seventh and eighth conductors are interchangeable.

Naturally, when several different options 7A–7G are to be driven by the modules 10, they can be driven by the one module shown or by separate modules wired as described in FIG. 2. The trigger for the continuous output at points P7 or P8 and in the yellow seventh or eighth conductors can derive from either pushbutton PB1 or PB2 or the remote control connected through switch PB1 to the third or blue conductor.

When the load connected to the seventh (or eighth) conductor or point P7 (or P8) is the motor of an air horn, it can be pulsed by the input received at point P1 or P2 of the positive or negative type car alarm siren.

I claim:

1. A wiring module for an automotive vehicle comprising:
   a housing;
   a first conductor connectable to a positively poled terminal of an intermittently operable load;
   a second conductor connectable to a negatively poled terminal of a intermittently operable load;
   a third conductor connectable to a positively poled trigger;
   a fourth conductor connectable to a negative source terminal or vehicle ground;
   a fifth conductor connectable to a negatively poled trigger;
   a sixth conductor connectable to a positive source terminal;
   seventh and eighth conductors selectively connectable to a further load to be continuously operated at a source voltage upon energization of one of said triggers; and
   circuitry in said module for actuating said further load and for electronically intermittently operating one of said intermittently operable loads upon respective connection to said conductors in response to selective energization of said triggers.

2. The wiring module defined in claim 1 wherein said housing is a sealed unit and said circuitry comprises a normally open relay switchable by said triggers and having contacts connecting said seventh and eighth conductors upon energization of said relay.

3. The wiring module defined in claim 2 wherein said circuit comprises a reverse-poled diode connected said second conductor, and a first transistor having a base connected to said diode, an emitter connected to said sixth conductor and a collector connected to said first conductor.

4. The wiring module defined in claim 3 wherein said circuit further comprises a forwardly poled further diode connected to said third conductor, and a further transistor having a base connected to said further diode, an emitter connected to said fourth conductor, and a collector connected through a diode to said relay at a junction with a reversely poled diode connected to said fifth conductor.

5. The wiring module defined in claim 4 wherein said circuit comprises another transistor having a base connected to the first conductor through the forwardly poled diode thereof, an emitter connected to said fourth conductor, and a collector connected through a capacitor to the base of said further transistor, the collector of said further transistor being connected to the base of said other transistor through another capacitor.

6. The wiring module defined in claim 5, further comprising a first resistor between the forwardly poled diode of the first conductor and the base of said other transistor, a second resistor between the forwardly poled diode of the first conductor and the base of said further transistor, a third resistor connected between the forwardly poled diode of the first conductor and the collector of said other transistor, a fourth resistor connected between the forwardly poled diode of said third conductor and the base of the further transistor, a fifth resistor connected between the reversely poled diode of said second conductor and the base of said first transistor, and a sixth resistor connected between the emitter and base of the first transistor.

7. The wiring module defined in claim 6 wherein a car alarm is connected to one of said first and second conductors.

8. The wiring module defined in claim 6 wherein a twelve-volt battery is connected as said source to said sixth conductor.

9. The wiring module defined in claim 6 wherein at least one air horn motor, car horn, alarm siren, strobe light, neon light, sound amplifier, cooling fan, parking light, remote-control unit or power antenna is connected to one of the seventh and eighth conductors.

10. The wiring module defined claim 6 wherein a remote control unit is connected to said third conductor.

11. The wiring module defined in claim 2 wherein said circuit further comprises a forwardly poled diode connected to said third conductor, and a transistor having a base connected to said diode, an emitter connected to said fourth conductor, and a collector connected through a diode to said relay at a junction with a reversely poled diode connected to said fifth conductor.

12. The wiring module defined in claim 2 wherein said circuit comprises a transistor having a base connected to the first conductor through a forwardly poled diode thereof, an emitter connected to said fourth conductor, and a collector connected through a capacitor to the base of a further transistor, the collector of said further transistor being connected to the base of the first-mentioned transistor through another capacitor.

* * * * *